United States Patent [11] 3,625,924

| [72] | Inventors | Nathan D. Field |
|---|---|---|
| | | Allentown, Pa.; |
| | | Donald H. Lorenz, Basking Ridge, N.J. |
| [21] | Appl. No. | 882,308 |
| [22] | Filed | Dec. 4, 1969 |
| [45] | Patented | Dec. 7, 1971 |
| [73] | Assignee | GAF Corporation |
| | | New York, N.Y. |

[54] ORIENTED FILMS OF METHYL VINYL ETHER-MALEIC ANHYDRIDE COPOLYMERS
12 Claims, No Drawings

[52] U.S. Cl.................................................. 260/78.5 T,
264/289
[51] Int. Cl......................................................... C08f 17/00
[50] Field of Search........................................... 260/78.5 T;
264/210 R, 210 F, 289

[56] References Cited
UNITED STATES PATENTS

| 2,979,774 | 4/1961 | Rusignolo.................... | 18/48 |
| 3,466,356 | 9/1969 | Carlson et al................ | 264/95 |

OTHER REFERENCES

Ban, Defensive Publication of S.N. 781,680, Filed Oct. 22, 1968 published in 862 O.G. 21, on May 6, 1969

*Primary Examiner*—Joseph L. Schofer
*Assistant Examiner*—John Kight, III
*Attorneys*—Walter C. Kehm and S. B. Leavitt ABSTRACT: Oriented films of polymers of methyl vinyl ether and maleic anhydride are disclosed. Additionally, terpolymers of methyl vinyl ether, maleic anhydride and higher alkyl vinyl ethers are disclosed. The films can be uniaxially, biaxially, or multiaxially oriented.

ORIENTED FILMS OF METHYL VINYL ETHER-MALEIC ANHYDRIDE COPOLYMERS

This invention relates to thermoplastic films and more particularly this invention relates to orientated films of polymers of methyl vinyl ether and maleic anhydride.

Copolymers of methyl vinyl ether and maleic anhydride are well known. Such polymers, having the general formula

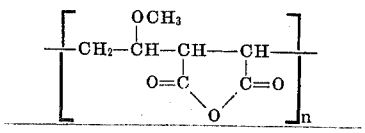

have many uses in the fields of textiles, adhesives and coatings, cosmetics, and making films, for example. The unmodified films have a high tensile strength, but are inherently brittle. For many uses, the brittleness is eliminated, to some extent, by the use of plasticizers. If certain properties, such as the inherent brittleness, could be improved, methyl vinyl ether-maleic anhydride films could find wide use as packaging films and for other purposes.

It has now been found that when films of methyl vinyl ether-maleic anhydride copolymers are oriented, uniaxially, biaxially, or multiaxially, their tensile strength becomes greatly increased, as well as their ultimate elongation. Moreover, the resistance of the films to hydrolysis is unexpectedly enhanced. The films exhibit much improved physical qualities such as toughness, and their impact strengths are considerably greater than the unoriented films. Additionally, and extremely importantly, the brittleness decreases to a point where the films can be used in water-soluble film packages. In view of the improved hydrolysis resistance of oriented methyl vinyl ether-maleic anhydride films, their usefulness for packaging water-soluble products wherein the outer layer has good storage stability but rapid water dissolution properties has been accomplished.

Accordingly, it is a primary object of the present invention to provide methyl vinyl ether-maleic anhydride copolymer films which are more flexible and less brittle than those heretofore known.

It is a further object of the present invention to provide oriented films of methyl vinyl ether-maleic anhydride copolymers.

Consistent with the foregoing objects, it has also been found that greatly improved properties can be obtained in films of terpolymers of methyl vinyl ether, maleic anhydride and another alkyl vinyl ether.

It is, therefore, another object of the present invention to provide oriented films of terpolymers of methyl vinyl ether, maleic anhydride and another alkyl vinyl ether.

In still another aspect of the present invention, it has been found that films made of partial esters of methyl vinyl ether-maleic anhydride copolymers and terpolymers exhibit greatly improved properties when oriented. Such partial esters are produced by the reaction of an excess of an alcohol with the methyl vinyl ether-maleic anhydride copolymer. The reaction is exemplified by the following equation:

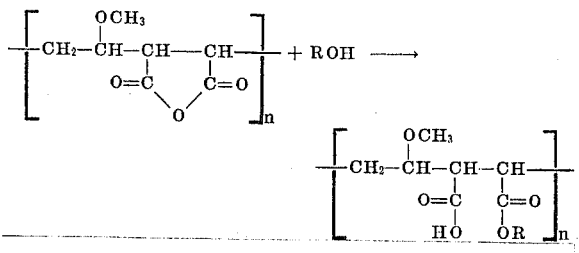

The reaction is a straightforward one and is described in U.S. Reissue Pat. No. 23,514, issued June 24, 1952.

The properties of a film formed from the partial ester of the methyl vinyl ether-maleic anhydride copolymer are dependent upon the alcohol used and the degree of esterification. Exemplary of alcohols which may be used are the following:
 methanol
 ethanol
 n-propanol
 isopropanol
 n-butanol
 sec-butanol
 1-decanol Of course, for reasons of economy, the lower alcohols, such as methanol, isopropanol, and butanol, are preferred.

Accordingly, it is yet another primary object of the present invention to provide partial esters of methyl vinyl ether-maleic anhydride copolymers and terpolymers with greatly improved properties.

It is a further object of the present invention to provide oriented films of methyl vinyl ether-maleic anhydride partial esters.

In accordance with the present invention, methyl vinyl ether-maleic anhydride polymers are oriented in one of a number of ways. As used herein, the term "methyl vinyl ether-maleic anhydride polymer" should be understood to include the copolymers as well as those polymers which include a third comonomer such as another alkyl vinyl ether. Additionally, such term includes the aforementioned partial esters of methyl vinyl ether-maleic anhydride copolymer and terpolymers thereof.

Polymerization of methyl vinyl ether and maleic anhydride is conducted in a well-known manner, resulting in a copolymer whose composition is approximately 50 mole percent methyl vinyl ether and 50 mole percent maleic anhydride. Such a copolymer is conveniently esterified by using an excess of an alcohol to form the partial ester. The terpolymers, films of which can be oriented according to the present invention, are formed by polymerizing in the same manner a mixture of monomers in which the methyl vinyl ether has been replaced in part by another alkyl vinyl ether. Such a third monomer has an alkyl group ranging from two to 22 carbon atoms. In the case of the terpolymer, the methyl vinyl ether is present in about 40 to 49 mole percent, the other alkyl vinyl ether is present in about 10 to 1 mole percent, and the maleic anhydride is present in about 50 mole percent. Exemplary of such termonomers are:
 ethyl vinyl ether
 propyl vinyl ether
 butyl vinyl ether
 amyl vinyl ether
 decyl vinyl ether
 dodecyl vinyl ether
 hexadecyl vinyl ether
 octadecyl vinyl ether
 eicosyl vinyl ether
 docosyl vinyl ether The films of the present invention are oriented either uniaxially, biaxially, or multiaxially. In order to prepare a uniaxially oriented film, the film is subjected to a stretching force in one direction, while being heated above the glass transition temperature, but below its decomposition temperature. If the film is plasticized, as for example with the solvent from which it was cast, the temperature at which it is stretched is significantly lowered, so that the film may even be oriented at or near room temperature. Since the temperature at which the film is to be oriented is related to the glass transition temperature of the particular polymer and the decomposition temperature of the same, one skilled in the art can easily determine the optimum temperature for performing that operation. Some of the solvents which may be used to cast the films and which, consequently, will exert a certain amount of plasticization are ketones like acetone, methyl ethyl ketone, or cyclohexanone, or chlorinated solvents like chloroform or methyl chloride. Additionally, more conventional, compatible plasticizers may be employed with equivalent results.

Biaxially oriented films are produced by subjecting the films to a stretching force in two directions, while heating the same above the glass transition temperature, but below the decomposition point of the particular films.

Multiaxially oriented films, according to this invention, may be prepared by vacuum forming or blow-molding operations on copolymer or terpolymer films.

Orientation of the films may be observed by means of crosspolarizers and noting the birefringence developed. In general, the films become more flexible on orientation and have improved tensile properties.

"Glass transition temperature" may be defined in various ways but, in a simplified form, it corresponds to the temperature at which a polymer changes from glasslike properties to more "rubbery" properties. It is for this reason that stretching of the polymer must be done above the glass transition temperature, since otherwise the film would essentially break because of its brittleness. At the same time, one must operate below the decomposition point to make a useful product. For a copolymer of methyl vinyl ether and maleic anhydride, this region corresponds to from about 160° to about 200° C. with the lower end of the range being preferred.

EXAMPLE 1

Uniaxial Orientation of Methyl Vinyl Ether-Maleic Anhydride Copolymer

A strip of film 1 inch wide by 2 inches long and 3 mils thick of poly(methylvinyl ether/maleic anhydride) of $\eta sp/c$ of 3.2 was placed in a film stretcher. The stretcher was placed in a heated chamber at 165° C. for 5 minutes and then the film was stretched to four times its original length.

When the film strip was placed between cross polarizers, birefringence was observed in the stretched portion. When viewed with a magnifying glass, a considerable amount of fibrillation in the direction of stretch was observed. Whereas the film before stretching will usually crack on the first bend, after stretching it withstands very many flexures perpendicular to the direction of stretch.

EXAMPLE 2

Biaxial Orientation

A piece of the same film as in example 1, 2 inches by 2 inches by 3 mils, having a tensile strength of 3510 lbs. per square inch and an elongation of 2.3 percent at break, was placed in a biaxial film stretcher, heated to 165° C., and stretched to 5 inches by 5 inches. At room temperature, the biaxially oriented film had a tensile strength of 7430 (i.e., an increase of over 110 percent) and an elongation at break of 3 percent (i.e., an increase of over 30 percent). The film after stretching was quite flexible, has little tendency to crack on flexure and showed improved chemical resistance to hydrolysis.

EXAMPLE 3

Multiaxial Orientation of Terpolymer of Methyl Vinyl Ether-Hexadecyl Vinyl Ether-Maleic Anhydride Copolymer A terpolymer of composition 47 percent MVE/3 percent $C_{16}VE/50$ percent maleic anhydride and $\eta sp/c$ of 3.6 was dissolved in acetone to make a 12 percent solution. Films were cast on mylar with a doctor blade spreader. Before the films were completely free of solvent, a film square was placed in an apparatus, and subjected to nitrogen pressure at room temperature, which forced a bubble to be blown from the film. The film bubble showed considerable flexibility. When the bubble was placed in hot water, after drying in a vacuum oven, the nonstretched portions of the bubble began to dissolve much more readily than did the stretched portion.

EXAMPLE 4

A Study of the Water Resistance of a Biaxially Oriented Poly (Methyl Vinyl Ether-Maleic Anhydride) Film A 2 inch by 2 inch by 3 mils film of poly(methyl vinyl ether-maleic anhydride) was stretched in a biaxial film stretcher at 175° C. to 4¾ inch 4 by and thirteen-sixteenths inch by 1½ mils. The central portion of the oriented film was mounted in a film holder for infrared measurement. Another piece of the original unstretched film was mounted in the film holder similarly. The infrared spectrum of the two films were measured as a function of time exposed to normal atmospheric water vapor. Thus, it was shown by infrared that the original unstretched film very rapidly picked up moisture changing by hydrolysis from the anhydride form to the acid form, the process taking about 3 days. The oriented film, on the other hand, showed much greater stability to water vapor, with no evidence of hydrolysis even after 2 weeks. Then gradually the anhydride peak decreased and the acid peak began to form, the total process of hydrolysis taking more than 3 weeks.

As illustrated by the foregoing examples, the orientation of films of copolymers of methyl vinyl ether-maleic anhydride substantially increases the tensile strength of the film and also substantially improves its resistance to moisture. The extent to which the films should be stretched, and thus the degree of orientation thereof, will depend in large measure on the degree of improvement in these properties which is desired. Ordinarily, however, the film should be stretched sufficiently so that there is at least about a 50 percent increase in the tensile strength of the stretched (oriented) film over that of the unstretched film. The amount of stretching necessary to effect such improvement can be determined by simple preliminary test. Consequently, one can obtain materials of tensile strength preferred for various requirements.

What is claimed is:

1. An oriented film of a polymer selected from the group consisting of methyl vinyl ether-maleic anhydride copolymer; terpolymers of methyl vinyl ether, maleic anhydride and another alkyl vinyl ether; and partial esters of methyl vinyl ether-maleic anhydride copolymer and terpolymers.

2. A film according to claim 1, which is uniaxially oriented.

3. A film according to claim 1, which is biaxially oriented.

4. A film according to claim 1, which is multiaxially oriented.

5. A film, according to claim 1, wherein said polymer is said copolymer and said copolymer and said methyl vinyl ether and said maleic anhydride are each present in about 50 mole percent.

6. A film according to claim 1, wherein said polymer is said partial ester.

7. A film according to claim 6, wherein the alcohol moiety of said partial ester has from one to 10 carbon atoms.

8. A film according to claim 7, wherein said alcohol moiety is derived from a member of the group consisting of ethyl alcohol, isopropyl alcohol and n-butyl alcohol.

9. A film according to claim 1, wherein said polymer is said terpolymer.

10. A film according to claim 9, wherein the alkyl group of said other alkyl vinyl ether has from two to 22 carbon atoms.

11. A film according to claim 9, wherein said methyl vinyl ether is present in about 40–49 mole percent, said other alkyl vinyl ether is present in from about 10–1 mole percent and said maleic anhydride is present in about 50 mole percent.

12. A film according to claim 11, wherein said other alkyl vinyl ether is hexadecyl vinyl ether.

* * * * *